Sept. 4, 1962
J. SPINA
3,052,433
SAFETY PARACHUTE OPENING DEVICE
Filed Dec. 15, 1960
2 Sheets-Sheet 1
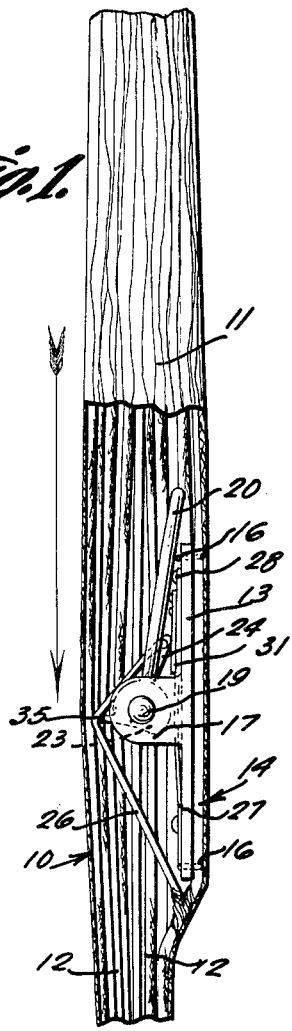
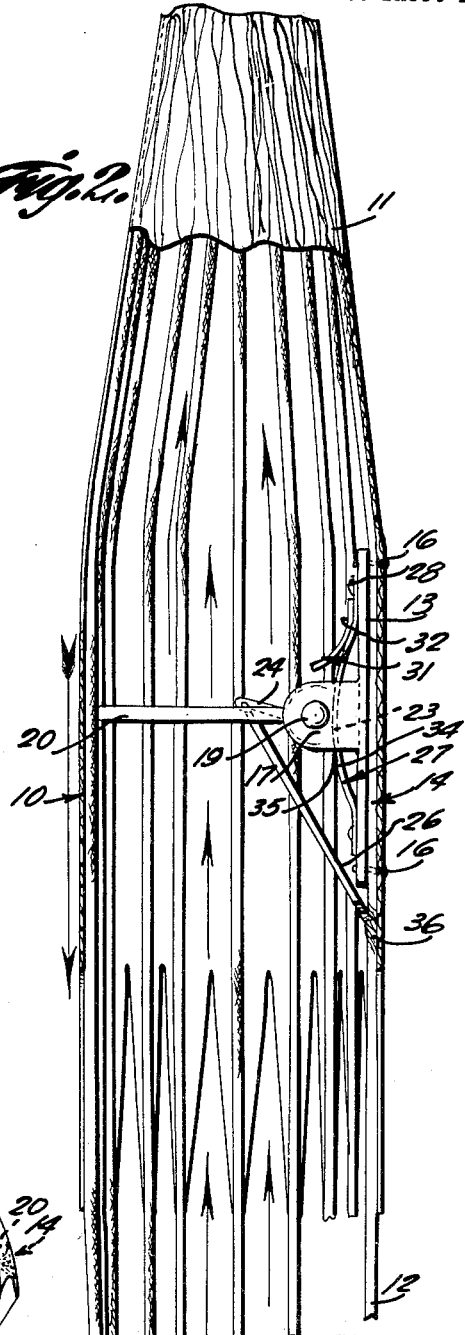
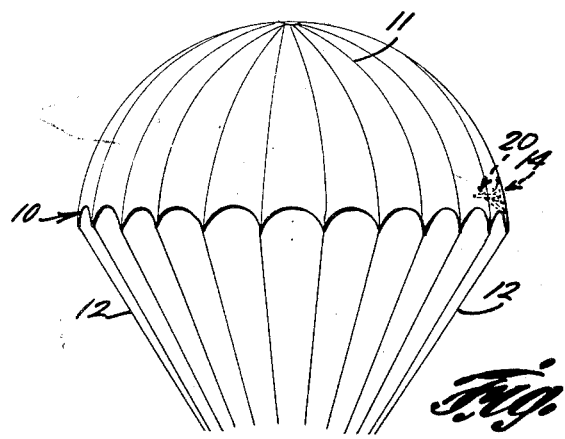
INVENTOR.
John Spina
BY
Victor J. Evans &c.
Attorneys

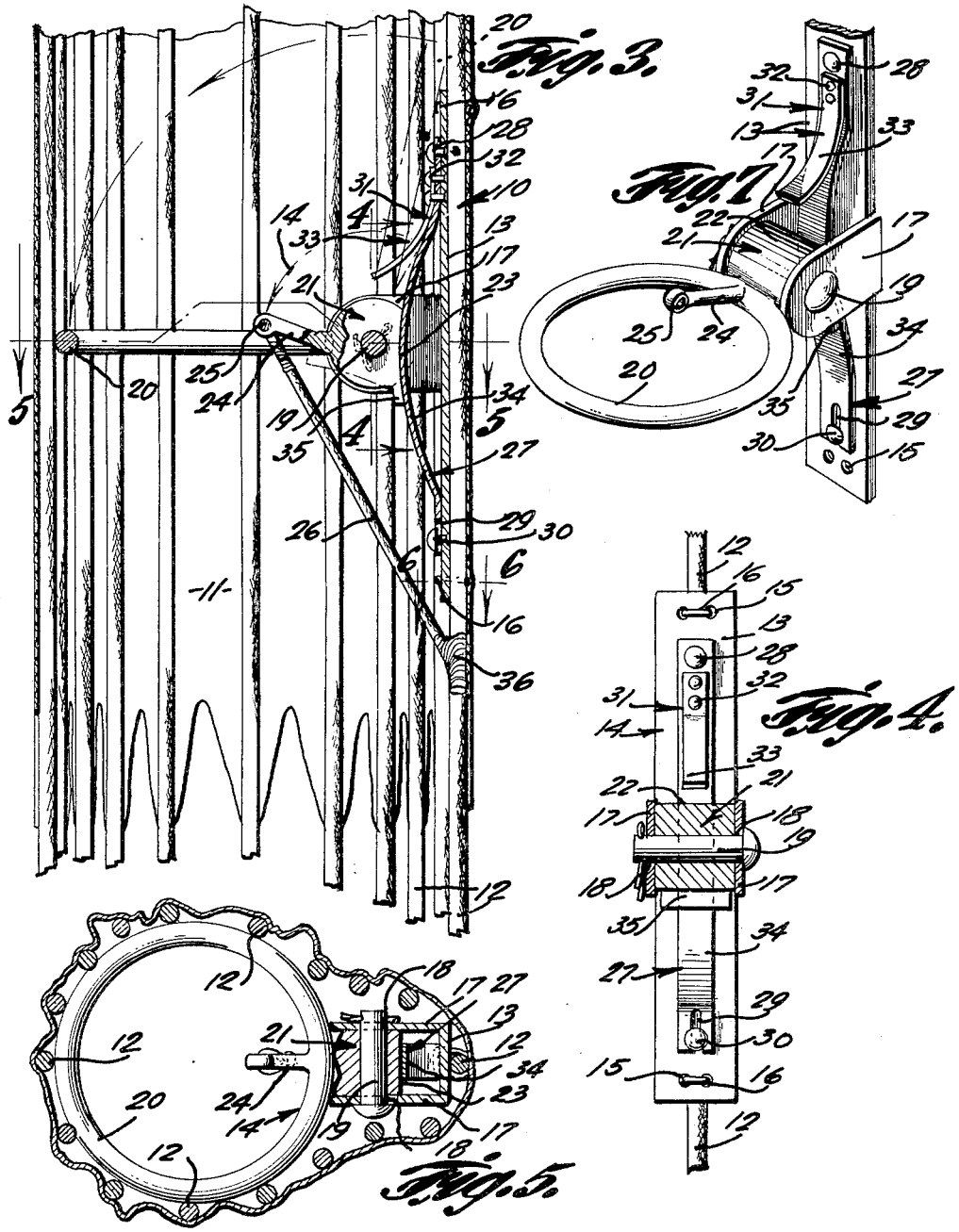

United States Patent Office 3,052,433
Patented Sept. 4, 1962

3,052,433
SAFETY PARACHUTE OPENING DEVICE
John Spina, 15 Elm St., Pittsfield, Mass.
Filed Dec. 15, 1960, Ser. No. 76,020
2 Claims. (Cl. 244—149)

This invention relates to a parachute, and more particularly to a device for insuring that the parachute will safely open when the parachutist jumps.

The primary object of this invention is to provide a safety opening device for parachutes wherein after the parachutist jumps from an airplane or the like, the parachute will be automatically and positively opened so that the parachutist can jump with greater safety, and wherein there will be less anxiety on the part of the jumper or parachutist since he will know that the parachute is equipped with the safety opening device for insuring that the parachute will open at the proper time.

A further object is to provide a parachute safety opening device of the type stated which is light in weight and which will serve to separate all of the main cords of the chute at the proper time whereby opening will be created at the bottom end of the chute so that as the parachutist continues to travel downward, air will be forced through the opening into the chute in order to force the chute to open.

Still another object is to provide such a parachute safety opening device that is economical to manufacture and efficient in operation and which is rugged in structure and foolproof in use.

These and other objects of the invention will become apparent from a reading of the following specification and claims, together with the accompanying drawings, wherein like parts are referred to and indicated by like reference characters, and wherein:

FIGURE 1 is an elevational view, with parts broken away and in section illustrating the safety opening device of the present invention affixed to a conventional parachute, and showing the parts in an initial position.

FIGURE 2 is an enlarged view generally similar to FIGURE 1 and showing the parts in a different position as the chute begins to open.

FIGURE 3 is an enlarged sectional view similar to FIGURE 2, and with parts broken away and in section.

FIGURE 4 is a sectional view taken on the line 4—4 of FIGURE 3.

FIGURE 5 is a sectional view taken on the line 5—5 of FIGURE 3.

FIGURE 6 is a sectional view taken on the line 6—6 of FIGURE 3.

FIGURE 7 is a perspective view illustrating the present invention per se.

FIGURE 8 is a fragmentary elevational view showing a parachute fully opened and showing in dotted line the position of the safety opening device of the present invention therein.

Referring in detail to the drawings, the numeral 10 indicates a conventional parachute which includes the usual canopy 11 and there is also provided a plurality of cords 12 which are arranged as for example as shown in FIGURE 8, and the lower ends of these cords are adapted to be connected to the usual harness for engagement with the body of the parachutist in the usual manner.

According to the present invention there is provided a safety device which is indicated generally by the numeral 14, and the safety device 14 serves to insure that the parachute 10 will automatically open after the user jumps whereby the parachute can be used with greater safety, and wherein the parachutist will have greater peace of mind since he will know that there will be no chance of the parachute not opening. The safety opening device 14 of the present invention comprises an elongated plate or support member 13 which is provided with openings 15 adjacent each end thereof, FIGURE 4, and fastening members 16 extend through these openings 15 and engage one of the cords 12 in order to fixedly secure the support member 13 in place inside the canopy 11.

The support member 13 is provided with a pair of spaced parallel flanges or ears 17, and the ears 17 have diametrically opposed openings 18 therein, FIGURE 4, there being a pivot pin 19 extending through the openings 18 for a purpose to be later described.

The numeral 20 indicates a ring member or hoop which has a bushing 21 formed integral with or secured to its outer periphery, and the bushing 21 includes a main portion 22 of rounded or cylindrical formation as well as a flattened surface or portion 23.

The numeral 24 indicates a tongue or arm which extends inwardly into the hoop 20 which is secured thereto or formed integral therewith, and the tongue 24 is provided with an opening 25. A line or cord 26 has one end connected to the opening 25 in the tongue 24, and the other end of the line 26 is suitably affixed to one of the main cords 12 of the parachute 10.

As shown in the drawings there is provided an elongated spring member which is indicated generally by the numeral 27, and the spring member 27 has its upper end fastened as at 28 to the support member 13. The lower end of the spring member 27 is provided with a slot 29 whereby a pin or securing element 30 can extend through this slot 29 in interengagement with the lower portion of the support member 13. The spring member 27 includes an intermediate outwardly bowed portion 34.

There is further provided a spring element 31 which is secured in place as at 32, and the spring element 31 includes an arcuate portion or section 33.

The numeral 35 indicates an extension or lug which is secured to or formed integral with the bushing 21.

From the foregoing, it is apparent that there has been provided a device which is adapted to function as a safety mechanism for insuring that a parachute such as the parachute 10 will open, and in use with the parts arranged as shown in the drawings, it will be seen that the unit 14 of the present invention is adapted to be mounted within the canopy portion 11 of the parachute 10, as for example as shown in FIGURE 8.

The parts can be made of any suitable material and in different shapes or sizes.

The main cords 12 of the chute lead to the top of the chute, and the main cords of the chute also lead to the jumper. FIGURE 2 shows the position of the hoop and its associated parts right after the jump, and the support member 13 is adapted to be attached to one of the main ropes or cords of the parachute as indicated by the numeral 12. FIGURE 8 illustrates the position of the hoop after the opening of the chute.

It will be seen that according to the present invention there has been provided a safety hoop for a parachute and the purpose of the present invention is to force the opening of the parachute such as the parachute 10. Since the parachutist will know that his chute is equipped with the safety device of the present invention, he will know in advance that it is going to open without fail and that he is going to land safely after every jump so that all fear or hesitation which is usually in the minds of any jumper at the zero hour will vanish from the mind of the jumper. The present invention consists of a minimum number of parts which can be made economically and the device is light in weight and ruggedly constructed.

As shown in the drawings there is provided the member 13 which may be made of a piece of metal that is not more than eight inches long, one and a quarter inches wide and an eighth of an inch thick and this member 13 is provided with a pair of ears 17 which have their opposed holes 18 therein whereby the pin 19 can extend through these openings in order to permit the hoop 20 to rotate. The holes 15 at the ends of the member 13 permit the member 13 to be fastened to one of the main cords of the chute as for example by means of a strong nylon thread as indicated by the numeral 16 and this thread may be wound around the cord and through the holes 15. The upper end of the spring member 27 is fastened to the support member 13 as for example by means of the rivet 28, and only the upper end of the spring member 27 is riveted to the support member 13. The other or lower end of the spring member 27 is provided with the slot 29 and the spring member is guided by the pin 30 which is fastened to the lower end of the member 13 so that the spring member 27 can slide along the lower portion of the support member 13 when the spring member 27 (which is curved or bowed at the center thereof as indicated by the numeral 34), is urged or biased downward by the round portion 22 of the hoop bushing 21 at the moment in which the hoop 20 is raised to the position generally parallel to the support member 13, such as that shown in FIGURE 1. This takes place only when the chute is being packed.

The present invention also includes the spring element 31 which is much shorter than the spring member 27, and the upper end of the spring member 31 is riveted as at 32 to the spring member 27. This spring element 31 is curved as at 33 and the purpose thereof is to aid the initial rotation of the hoop 20 as for example from the parallel position of FIGURE 1 to a ninety degree position such as that shown in FIGURES 2 and 3, which is the important and necessary one for the opening of the parachute. When the hoop is raised to assume the position generally parallel to the member 13 as for example as shown in broken lines of FIGURE 3 or as shown in FIGURE 1, the tongue 24 which is part of the hoop 20, is slightly raised as shown in FIGURE 1 so as to press the spring 31 down to an almost flat position.

The following is an explanation of the operation or use of the present invention. At the instant the parachutist decides to operate his chute, the chute unfolds and assumes an elongated shape caused by the weight of the parachutist and the resistance of the air, as for example as shown in FIGURE 1. At this moment the hoop 20, which is generally parallel to the member 13 as shown in FIGURE 1 is free for action, and the spring 31 gives the hoop 20 its initial rotation by pushing the tongue 24. The line or nylon cord 26 is of a measured length and one end of this line 26 is looped through the hole 25 of the tongue 24, and the other end of the line 26 is interwoven with the chute's main cord at a point 36 so that it will complete the rotation of the hoop to the position approximately ninety degrees from that shown in FIGURE 1 whereby the hoop will be in a position such as that shown in FIGURES 2 and 3 and with the hoop 20 in the position of FIGURES 2 and 3 all the cords of the chute will be separated. The hoop will not go beyond its ninety degrees rotation because the metal extension or lug 35, which is also part of the hoop, will prevent such movement. The central portion 34 of the longer spring member 27 will come in contact with the flat portion 23 of the hoop bushing 21 and this will help keep the hoop in the ninety degree location.

In view of the fact that the hoop will have separated all of the main cords of the chute, an opening will have been created at the bottom end of the chute, and as the parachute is continued to travel downward, air is forced through the opening into the chute forcing it to open. FIGURE 8 illustrates the position of the hoop after the opening of the parachute. Instead of utilizing a circular hoop, a hoop of a different shape can be used and for example the hoop may have an octagonal, hexagonal shape or the like.

The hoop is adapted to be retained in the position shown in FIGURE 1 by folding the parachute up so that the parts assume the position shown in FIGURE 1. The present invention includes the pivotal mounting means which provides a pivotal mounting between the hoop and the support member, and this pivotal mounting is necessary in order to permit the safety parachute opening device of the present invention to properly function in the desired or required manner.

Minor changes in shape, size and rearrangement of details coming within the field of invention claimed may be resorted to in actual practice, if desired.

What is claimed is:

1. In a parachute, a canopy, a plurality of cords extending from said canopy, a support member mounted adjacent the inner surface of said canopy and said support member being fastened to one of said cords, a pair of spaced parallel apertured ears extending from said support member intermediate the ends thereof, a pin extending through said apertured ears, a hoop having a bushing affixed thereto and said bushing including a rounded portion and a flattened surface and said bushing rotatably mounted on said pin, a tongue connected to said hoop and said tongue extending inwardly into the hoop, said tongue having an opening in an end thereof, a line having one end connected to the opening in said tongue and the other end of said line being connected to one of said cords; a spring member including an intermediate outwardly bowed portion and said spring member having its upper end secured to said support member, there being a slot in the lower portion of said spring member, a securing element extending through said slot and connected to said support member, an extension lug on said bushing, and a curved spring element having its upper end affixed to said spring member.

2. A parachute comprising a canopy and a plurality of cords, a safety opening device for said parachute comprising a support member connected to one of said cords and said support member having apertured ears thereon, a hoop including a bushing swivelly mounted between said ears, a spring member connected to said support member, and a spring element affixed to said spring member, said bushing including a rounded portion and a flat portion, an extension lug on the hoop, a tongue extending inwardly into the hoop, and a line connecting said tongue to one of said cords.

References Cited in the file of this patent
UNITED STATES PATENTS

| 982,907 | Ulmer | Jan. 31, 1911 |
| 1,341,794 | El Vean | June 1, 1920 |
| 2,103,806 | Willing | Dec. 28, 1937 |

FOREIGN PATENTS

| 670,317 | France | Aug. 7, 1929 |